United States Patent [19]  [11] 4,151,035
Jellison  [45] Apr. 24, 1979

[54] BUILDING MACHINE HAVING AN INFINITE NUMBER OF DRUM SETTINGS

[75] Inventor: Frank R. Jellison, Canton, Ohio

[73] Assignee: The General Tire & Rubber Company, Akron, Ohio

[21] Appl. No.: 770,345

[22] Filed: Feb. 22, 1977

Related U.S. Application Data

[63] Continuation-in-part of Ser. No. 472,314, May 22, 1974, abandoned, which is a continuation-in-part of Ser. No. 606,142, Aug. 20, 1975, abandoned.

[51] Int. Cl.² ............................................. B29H 17/16
[52] U.S. Cl. .................................... 156/415; 156/133; 156/417
[58] Field of Search ............... 156/132, 133, 401, 414, 156/415, 416, 417, 418, 419, 420

[56] References Cited

U.S. PATENT DOCUMENTS

| 2,367,831 | 1/1945 | Manson | 156/415 |
| 2,628,652 | 2/1953 | Orr | 156/132 |
| 2,715,933 | 8/1955 | Frazier | 156/401 |
| 3,171,769 | 3/1965 | Henley et al. | 156/401 |
| 3,375,154 | 3/1968 | Ruttenberg et al. | 156/418 |
| 3,475,254 | 10/1969 | Henley | 156/401 |
| 3,684,621 | 8/1972 | Frazier et al. | 156/401 |
| 3,778,326 | 12/1973 | Gazuit | 156/420 |
| 3,816,218 | 6/1974 | Felten | 156/401 |

Primary Examiner—John E. Kittle

[57] ABSTRACT

A tire building drum has an infinite number of length and diameter settings. The drum can be used to build various size tires. The diameter of the drum can also be varied during the tire building operation to improve the tire building procedure.

6 Claims, 12 Drawing Figures

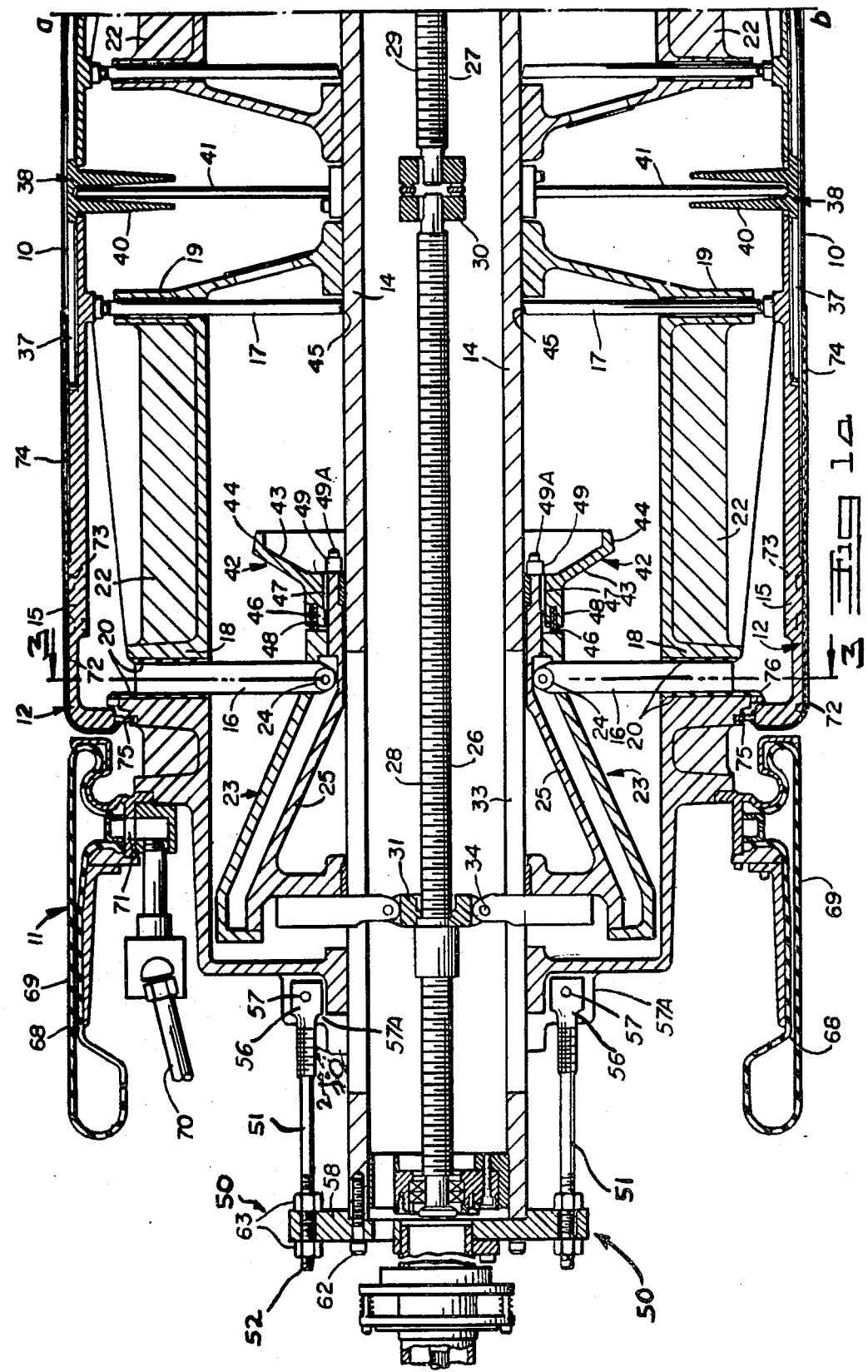

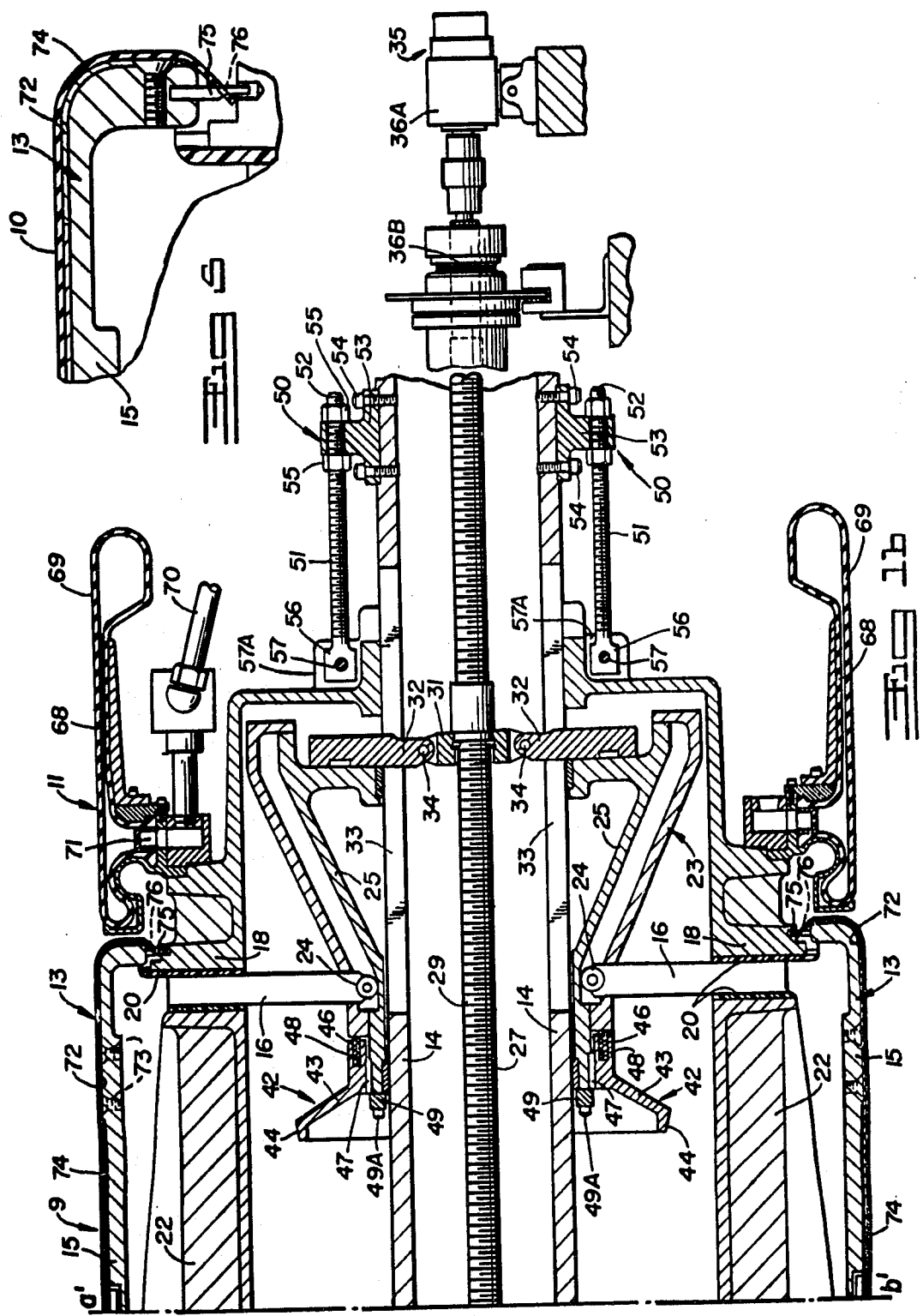

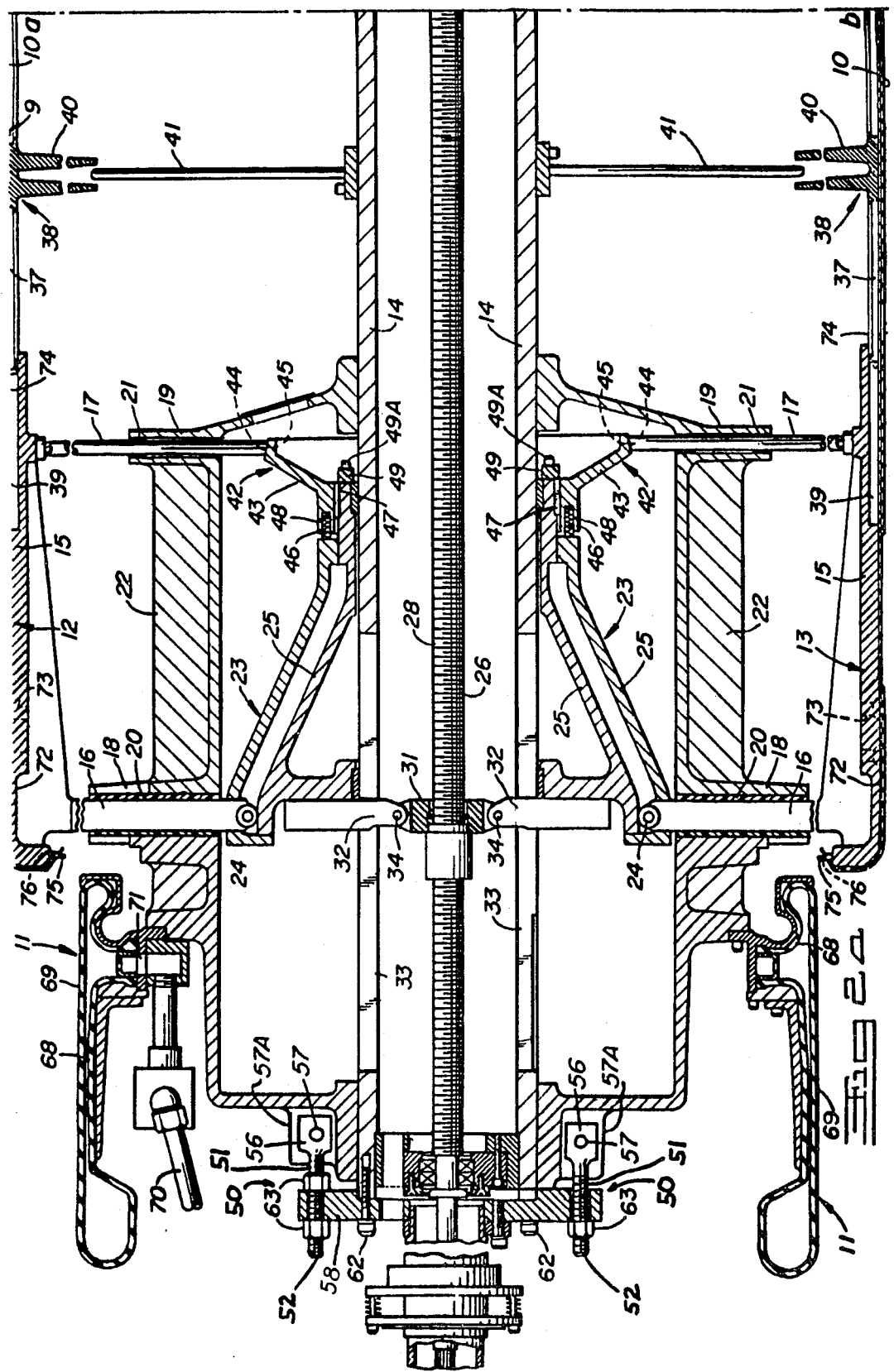

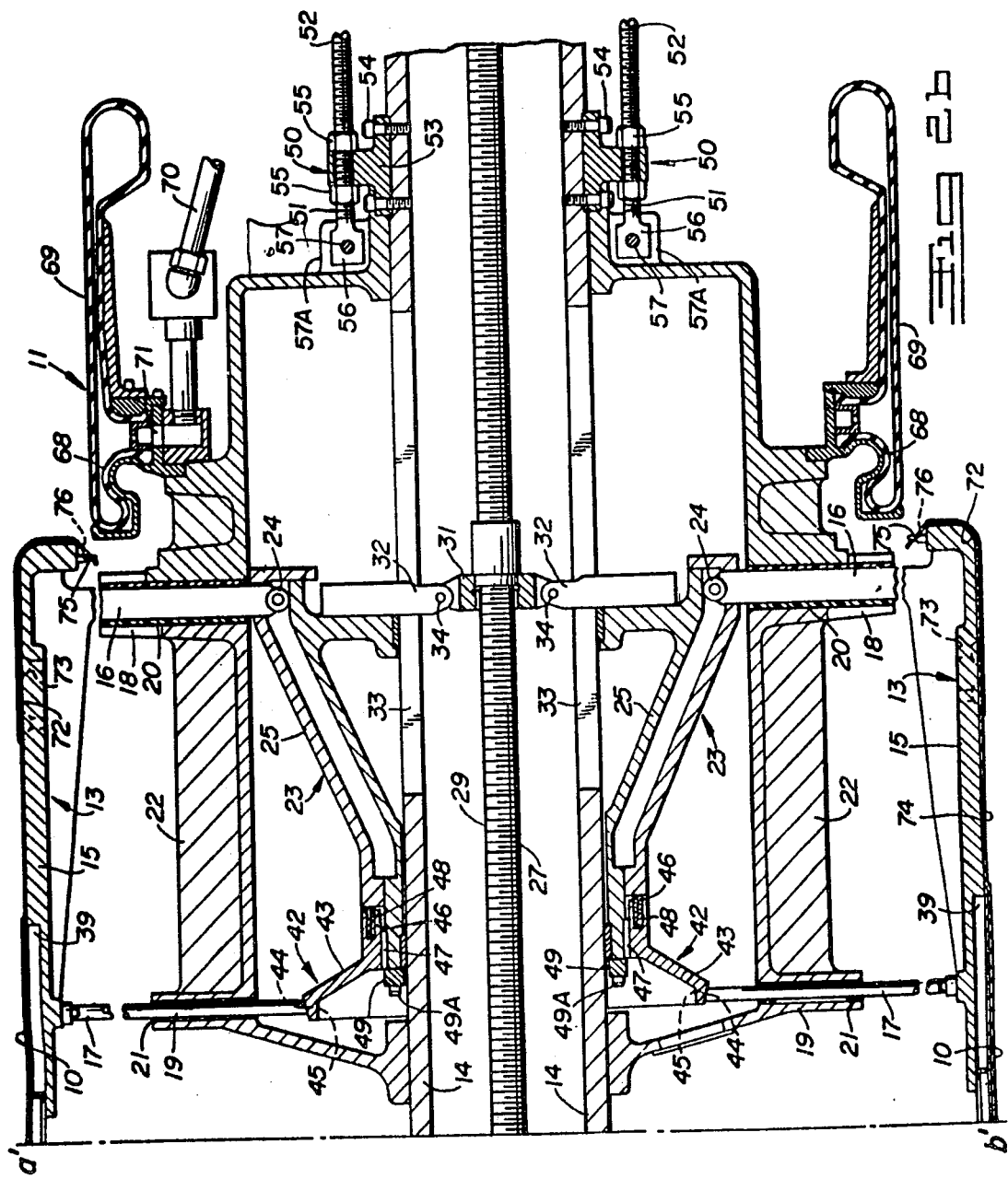

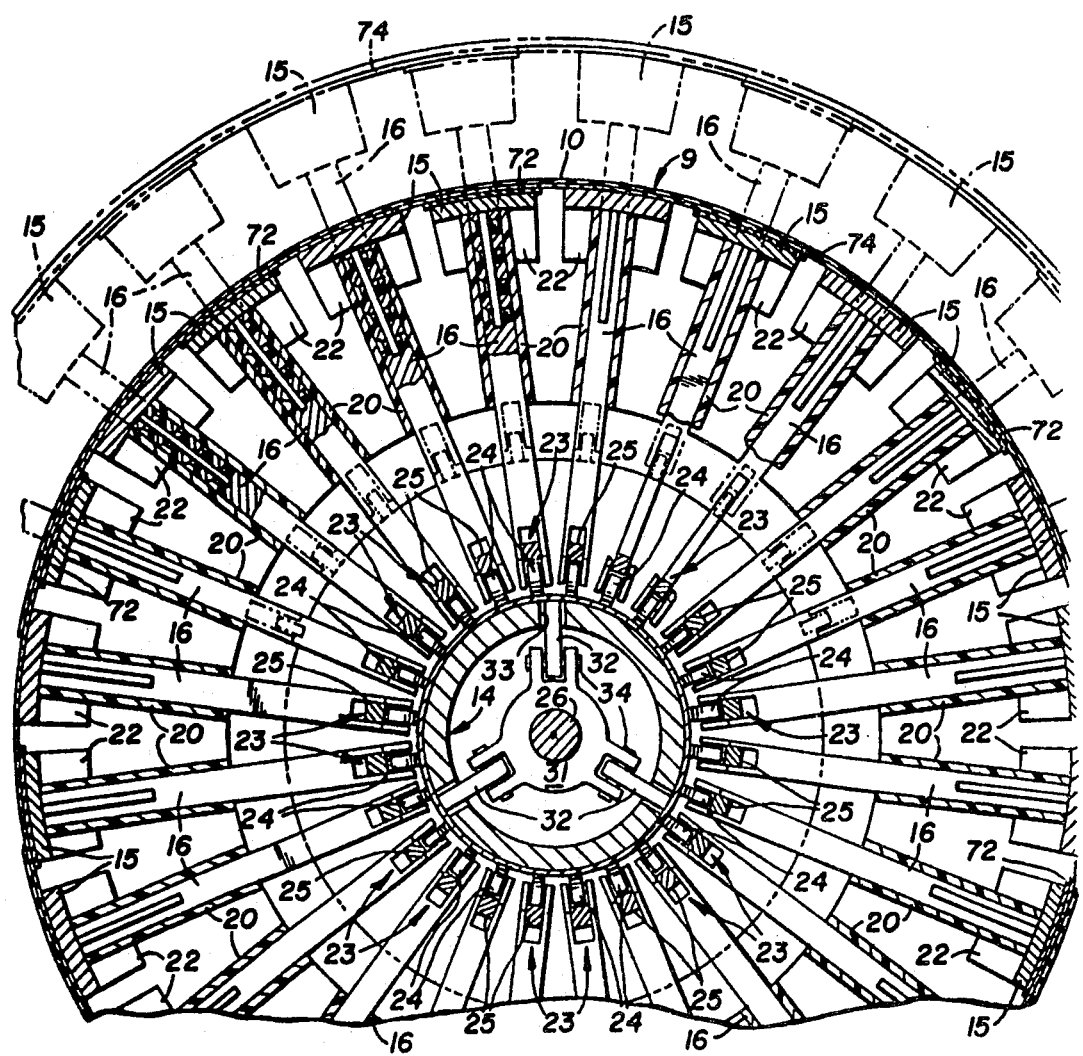
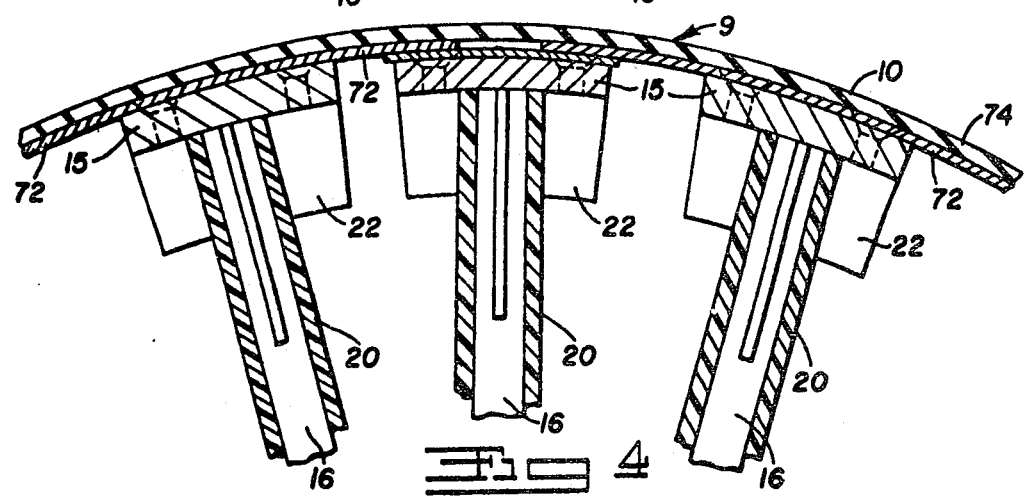

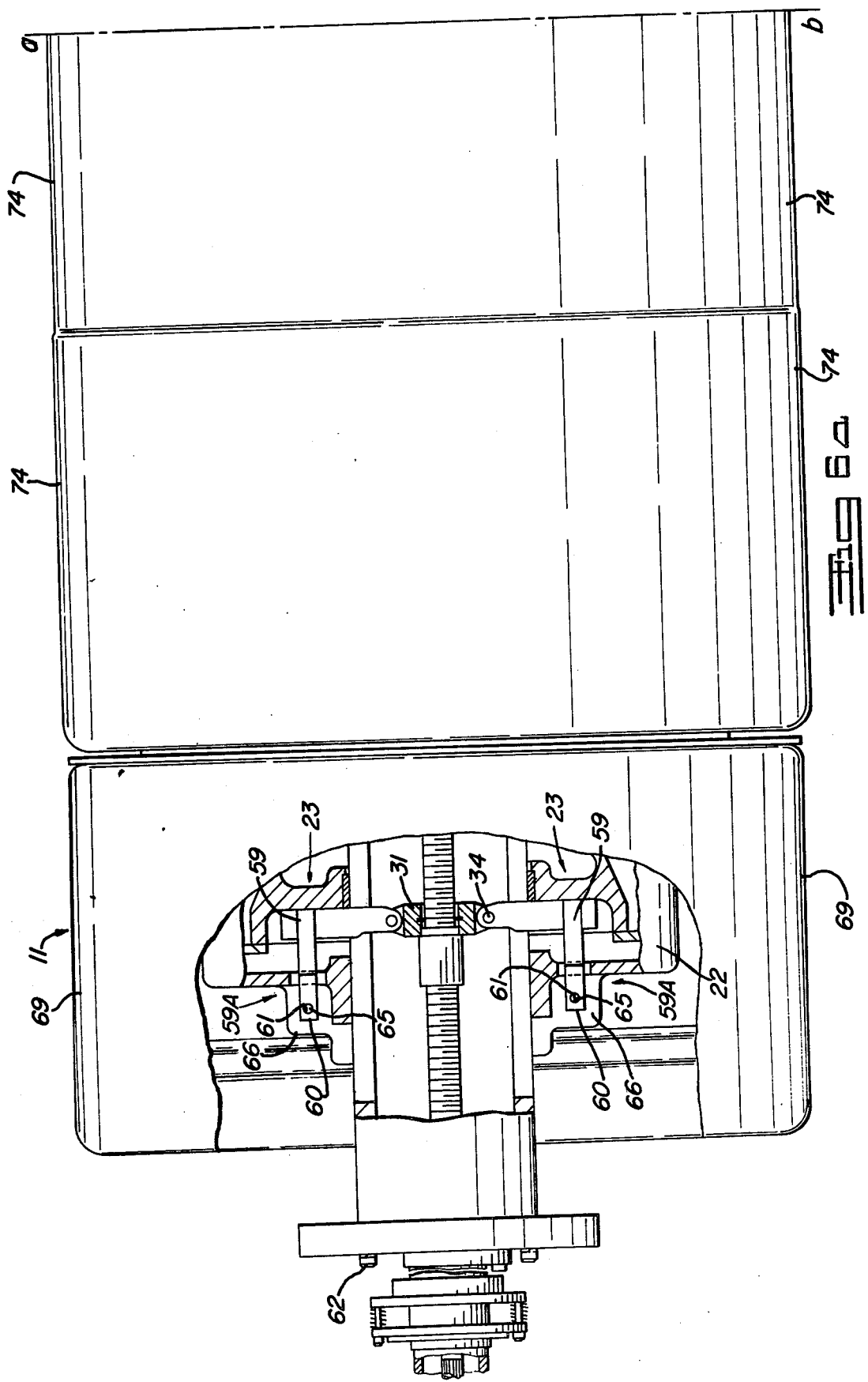

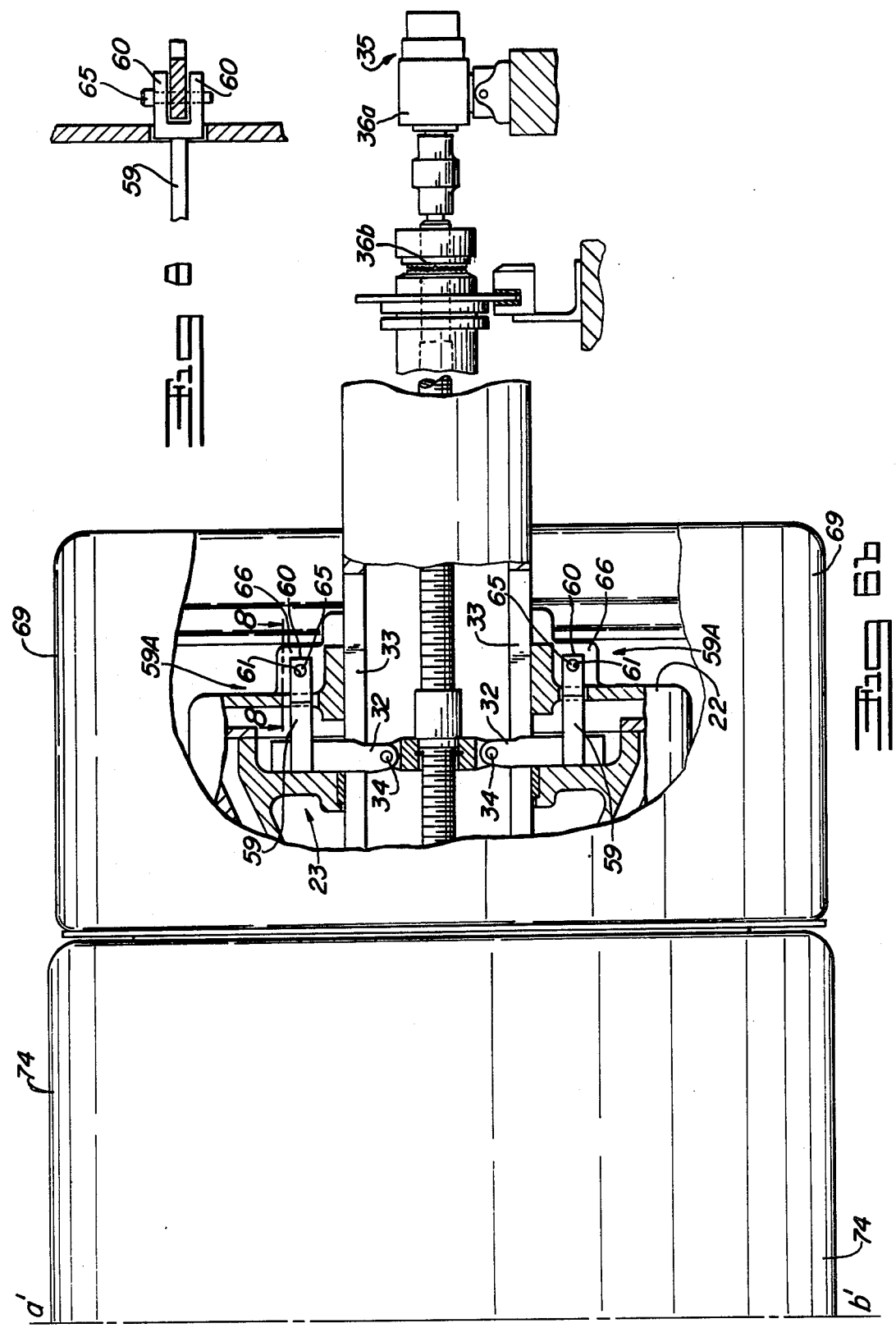

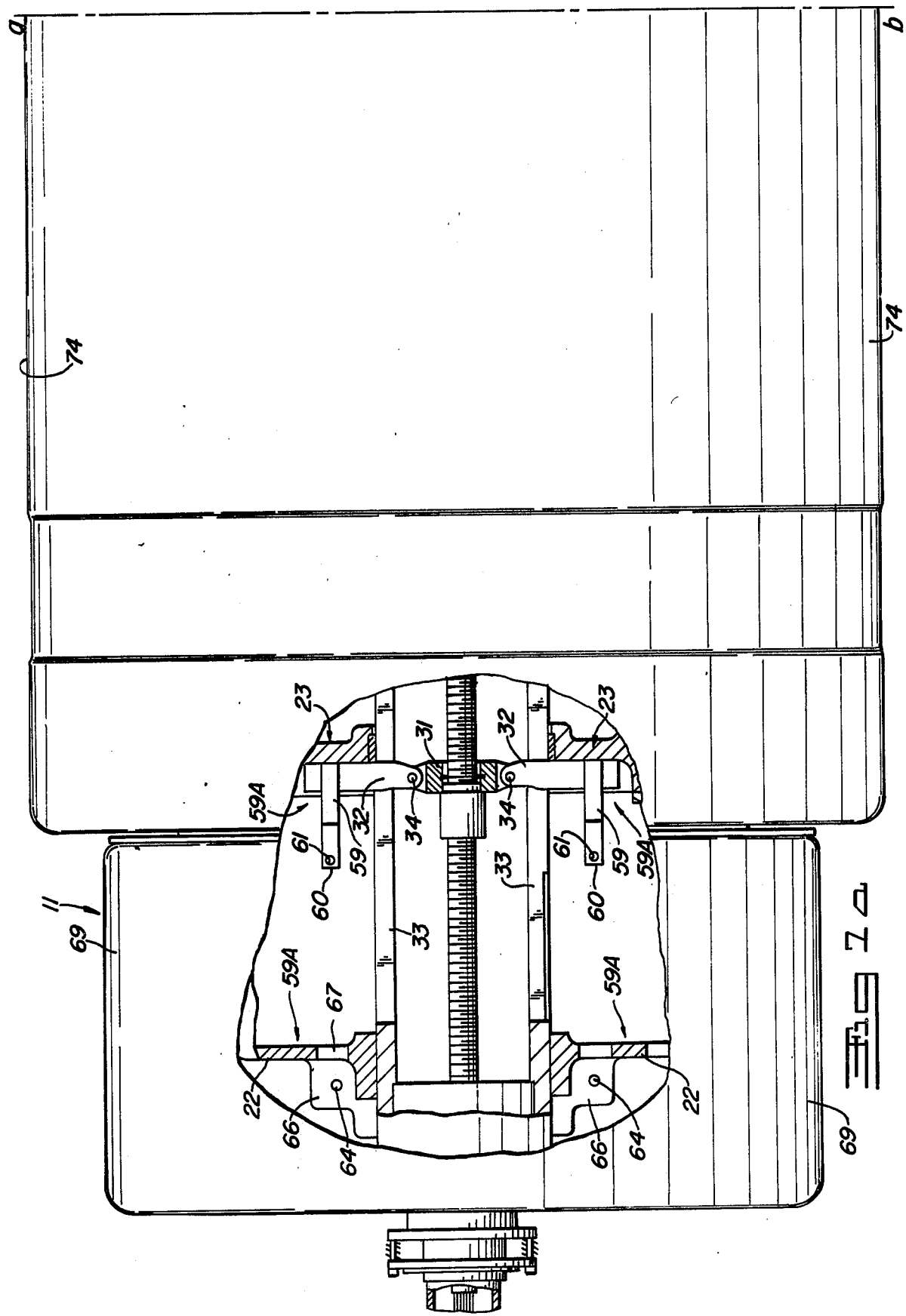

BUILDING MACHINE HAVING AN INFINITE NUMBER OF DRUM SETTINGS

CROSS REFERENCE TO RELATED APPLICATIONS

This application is a continuation in part of my co-pending application Ser. No. 472,314 filed May 22, 1974, which in turn is a continuation in part of application Ser. No. 606,142 filed Aug. 20, 1975, both now abandoned.

FIELD OF THE INVENTION

The present invention relates to apparatus for building pneumatic tires and particularly off-the-highway pneumatic tires.

BACKGROUND OF THE INVENTION

Pneumatic tires are typically comprised of a tire carcass and a tread. The carcass has two or more layers of rubberized fabric or metal usually in a cord or cable form and provides the foundation structure for the tire. The carcass also has reinforcing sidewalls, and a pair of circumferential beads adapted to hold the tire on a rim of a wheel and pneumatically seal the tire with the wheel. The tread of rubber typically filled with carbon black, is integrated with the tire carcass and provides the ground-engaging surface of the tire. A breaker or belt assembly is also sometimes provided between the carcass and tread portion and, depending on the type of tire being built, may be assembled with either the carcass or the tread.

Pneumatic tires are categorized by whether the reinforcing cords in the plies of the carcass are radial or bias to the axial centerline of the tire. Tires of the bias type have been built by the "flat band" method utilizing equipment such as that described in U.S. Pat. Nos. 2,614,951, 2,614,952, 2,628,652, 3,171,769, 3,156,601 and 3,645,826, all of which are owned by the assignee of the present application. Typically, tires of radial type have been built by the "toric match" method utilizing a method and equipment such as that described in U.S. Pat. No. 3,475,254, which is also owned by the assignee of the present application.

The building techniques for building both radial and bias ply tires are similar in that the tires are built on one or more expansible cylindrical drums. In either case, building is commenced by placing one or more carcass plies around such an expansible building drum so as to form an annular flat band with edge portions of the band overhanging the ends of the drum. Then, the drum surface is uniformly radially expanded to a second diameter, to provide a bead ring receiving shoulder at each end of the drum. Thereafter, annular bead rings, which usually consist of essentially inextensible rubberized cords and/or wires, are abutted or seated against said shoulders by bead ring seating or carrier means; and the edges of the band are then wrapped, typically by inflatable, turnup bladders and annular pushover rings, around the bead ring and folded back on and stitched to the outer surface of the annular bands.

One of the primary difficulties with such expansible building drums has been that they provided no flexibility in their expansion. Whether expanded by an inflatable bladder, e.g. see U.S. Pat. No. 3,475,254, or by a mechanical drive, e.g. see U.S. Pat. No. 3,698,987, the expansible drum is either positioned at one of two diameter settings, i.e. the first diameter where the carcass plies are applied, and the second diameter where the beads are formed. There is no intermediate diameter settings possible. Further, there is no positive control or flexibility in the diameter settings for both expanding and contracting the drum.

Various diameter settings facilitate the building of certain pneumatic tires and particularly off-the-highway pneumatic tires. Off-the-highway tires are pneumatic tires of very large (or "giant") size and varied bead diameters for tractors, road graders, earthmovers and the like. Typically, only a few tires may be made of one diameter and then the production is changed to a tire of a different bead diameter. With known building machines, this change-over requires the use of different building drums. The production is shut-down for some hours while one drum is detached and another assembled in place. Furthermore, with such tires, it expedites the building operation if a portion of the carcass, e.g. subsequent plies and sidewalls, can be assembled with the building at an intermediate diameter or diameters between a first diameter at which the first carcass plies are applied and a second diameter at which the beads are formed and possibly the tread rubber applied.

Another difficulty with such expansible building drums is that an inflatable rubber bladder is utilized for at least a part of the expansion. Air and rubber are notoriously unstable in positioning and therefore dimensional stability of the drum is difficult to maintain. Maintenance of this stability is a particularly difficult problem with giant off-the-highway tires where high forces are needed especially in bending the construction material. A related problem is the expansion capability of existing building drums which limit the size of tires that can be made.

SUMMARY OF THE INVENTION

The present invention provides an expansible build-drum with an infinite number of diameter and length settings between the smallest diameter and length and largest diameter and lengths. The largest diameter is preferably 20 to 25% greater than the smallest diameter. Tires of different bead diameters particularly of giant off-the-highway sizes can thus be built in succession without a shut-down of production. Further, certain pneumatic tires can be built more rapidly and of better quality by the application of carcass plies, sidewalls, possibly breakers and even tread rubber at different diameters.

The expansible tire building drum comprises a building drum of substantially cylindrical shape adapted for building at least a portion of a pneumatic tire thereon. The building drum is rotatably mounted axially on a hollow spindle. A plurality of arcuate segments are positioned about the drum at opposite end portions uniformly spaced from the central axis of the drum to define at least part of the cylindrical surface of the drum. The arcuate segments are preferably independently positioned by a plurality of segment stems in each said end portion of the drum with each segment stem adapted to radially support an arcuate segment. The segment stems are in turn supported by a plurality of stem support members positioned in each end portion of the drum with each stem portion adapted to radially slide within the stem support member.

The arcuate segments and segment stems are radially moved preferably uniformly about the axial centerline of the building drum by a cam means slidably mounted coaxially on said hollow spindle at each said end portion of the drum. The cam means is adapted to move the arcuate segments and segment stems radially on axial movement of the cam means. The cam means is in turn driven axially by at least one drive shaft rotatably mounted within said hollow spindle. Preferably two screw drive shafts are provided end-to-end axially within the hollow spindle and rigidly fastened to each other at the radial centerline of the drum. The screw shafts are threaded with threads of opposite pitch so that on rotation of the drive shafts in unison, the cam means can be adaptably driven simultaneously toward or away from the radial centerline of the building drum. Preferably the drive shafts are adapted for driving the cam means axially on rotation by providing a threaded collar on the drive shafts which is preferably pivotally mounted to the cam track of the cam means through a slot in the hollow spindle. The building drum can thus be positively expanded and contracted simply by rotation of the drive shafts by a standard power means such as a hydraulic or electric motor. Preferably, the drive shaft is provided with a suitable clutch or brake mechanism so that on stoppage of the power means the drive shaft is immediately stopped and held.

Preferably, alternate arcuate segments around each end portion of the building drum has cover plates fastened thereto which overlap the opposite alternate arcuate segments. These overlapping cover plates telescope and bridge spaces between arcuate segments as the building drum expands. The building drum also preferably includes a plurality of arcuate center segments positioned about center portions of the building drum and overlapping the arcuate segments at each end portion of the drum. Preferably, the center segments are slidably positioned in contact with the arcuate segments to provide for axial expansion and contraction of the building drum while providing, with said arcuate segments, a smooth, cylindrical surface for the building drum. In addition, central segment guide means are provided for slidably guiding the central segments radially on radial movement of the arcuate segments at each end portion of the building drum.

Push rods are also preferably positioned centrally of the segment stems at each end portion of the drum with rod support members slidably supporting the push rods for radial movement. At least one guide support member is hence mounted about the rotatable spindle at each end portion of the drum and is adapted to engage the push rods when the arcuate segments are extended to preset radial position(s) and radially support said arcuate segments substantially rigidly at said position(s). By this arrangement, the arcuate segments, which are cantilevered during expansion, are supported at substantially uniform diameter(s) along the length of the building drum and the radial sagging and tapering of the drum to a smaller diameter toward the radial center of the building drum is avoided. This locking feature provides for more uniform spreading of the ply cords along the drum and facilitates removal of the tire at the end of the building operation. Furthermore, this feature provides a firm suface for better and more uniform stitching of the various tire components during construction.

In addition, an elastomeric sleeve is preferably disposed coaxially over the cylindrical surface of the building drum, and the sleeve is fastened over the end portions to said arcuate segments. This arrangement reduces the stretch on the sleeve particularly in the radial direction during expansion of the drum and in turn increases the efficiency and the extent of radial expansion of the drum, while reducing the relative movement between the tire construction material and the building drum.

Preferably, the elastomeric sleeve is fastened to said arcuate segments about the end portions of the drum by providing pins on the arcuate segments and openings, preferably of reinforced metal or rubber grommets, in end portions of the elastomeric sleeve adapted to engage said pins. By this arrangement, the flexibility of the building drum is increased because the elastomeric sleeve can be rapidly slipped off and another sleeve pulled on with each axial set of the building drum. Further, such elastomeric sleeves can be manufactured more economically because no mold is required to form a bead around the sleeve at the end portions thereof with which to "lock in the sleeve".

Further, shoulder frames are preferably provided at each end portion of the building drum slidably fastened co-axially on the spindle and adapted to support the stem support members. Two sets of tie rod means are also provided. The first set of tie rod means are capable of rigidly fastening the slidable shoulder frame relative to said spindle while leaving the cam means axially slidable on the spindle. The second set of tie rod means are provided for fastening the cam means to the shoulder frame for axially changing the length of the drum from shoulder to shoulder. By this arrangement, the drive shafts provide a dual purpose of axially moving the end portions of the drum toward and away from the radial centerline of the drum to provide varying axial sets when the first set of tie rod means are unfastened and the second set of tie rod means are fastened as well as driving the radial expansion of the building drum as above described, when the first set of tie rod means are fastened and the second set of tie rod means are unfastened.

Preferably, said first set of tie rod means also axially support said shoulder frame at least during building of bead portions of the tire carcass and preferably throughout the tire building operations. The first set of tie rod means thereby avoid high thrust and bending forces on the spindle particularly during the turn-up operation and in turn, adds dimensional stability to and extends the useful life of the drum. For the same reasons, the shoulder frame preferably supports turn-up bladders positioned adjacent each end portion outwardly of the end portions of the building drum.

The primary advantage of the building drum is the production of better quality pneumatic tires and particularly giant off-the-highway pneumatic tires. Since the expansion of the drum can be stopped and positively held at any diameter between the smallest and the largest diameter, the construction material can be applied at any diameter reducing stretch and distortion in various components and particularly the carcass plies. Also, the "end count" of the cords in various plies can be held to a different (higher) value by applying the plies at a larger diameter than the smallest diameter of the drum, and tires of different bead diameters can be readily made without any change to the building drum. Further, higher forces can be applied to the tire construction material and larger drum expansions can be facilitated so that larger and more dimensionally varied giant off-the-highway pneumatic tires can be built.

Other details, objects and advantages of the invention will become apparent as the following description of the presently preferred embodiments and presently preferred methods of practicing the same proceeds.

BRIEF DESCRIPTION OF THE DRAWINGS

In the accompanying drawings, the preferred embodiments of the invention and presently preferred methods of practicing the invention are illustrated, in which:

FIGS. 1a-1b is a side elevational view partially in cross-section axially through the expansible tire building drum embodying the present invention before axial and radial expansion.

FIGS. 2a-2b is a side elevational view in cross-section axially through the expansible tire building drum shown in FIG. 1 after radial and axial expansion of the drum;

FIG. 3 is a partial end elevational view in cross-section taken along line 3—3 of FIG. 1;

FIG. 4 is an enlarged fragmentary view of a portion of FIG. 3;

FIG. 5 is an enlarged fragmentary view of a portion of FIG. 2;

FIGS. 6a-6b is a side elevational view partially in cross-section axially through the expansible tire building drum rotated 90° from its position shown in FIGS. 1a-1b;

FIGS. 7a-7b is a side elevational view partially in cross-section axially through the expansible tire building drum rotated 90° from its position shown in FIGS. 2a-2b; and FIG. 8 is a top view of the bifurcated tie rod pinned to the drum flange.

DESCRIPTION OF THE PREFERRED EMBODIMENTS

Figure 7B:
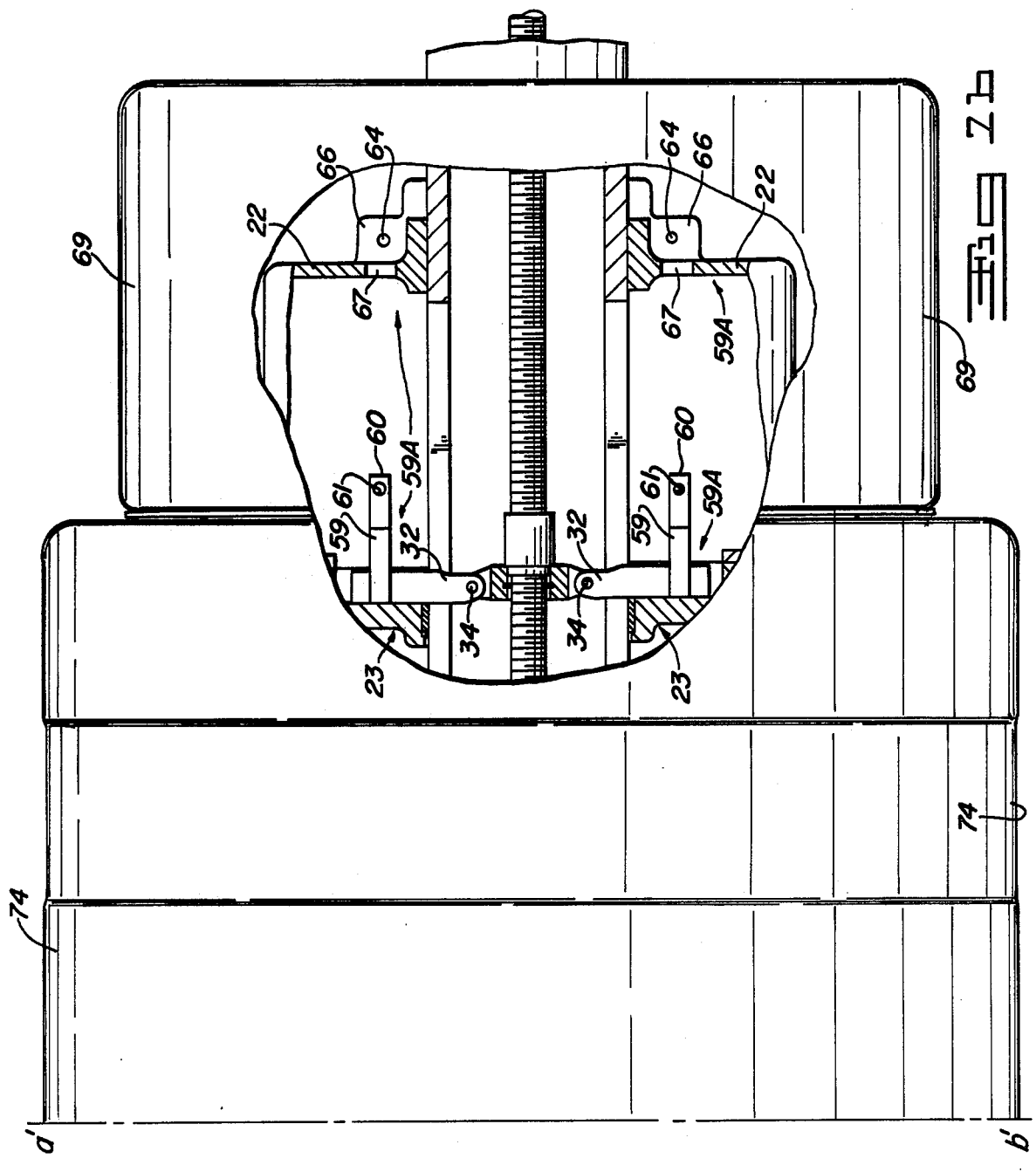

Referring to FIG. 1, a partial cross-sectional view through the axial centerline of a pneumatic tire building machine is shown having an expansible building drum 9 with a substantially cylindrical outer surface 10 and annular extensions 11 positioned axially at each end portion 12 and 13 of the drum. Drum 9 is rotatably mounted on hollow spindle 14 in cantilever from a tail stock mounting (not shown) adjacent inboard end portion 13. The tail stock mounting for spindle 14 is a standard housing and mounting the details of which are found by reference to U.S. Pat. No. 3,475,254 and other references above cited. Spindle 14 is also rotatably driven by suitable means as described by reference in U.S. Pat. No. 3,475,254.

Each end portion 12 and 13 of drum 9 has a plurality of arcuate segments 15 positioned about drum 9 an equal distance from the axial centerline of drum 9. Segments 15 at each end portion are composed of relatively rigid, preferably, metal elements which are relatively narrow in width compared to length, and which cooperatively define a portion of cylindrical surface 10 at each end portion about spindle 14. Each segment 15 has integral segment stem 16 and push rod 17 extending radially inwardly and adapted to radially support the arcuate segment 15. Each segment stem 16 and push rod 17 is slidably positioned in a stem and rod support member 18 and 19, respectively, by bushings 20 and 21, respectively. Stem and rod support members 18 and 19 are an integral part of cylindrical shoulder frame 22. Shoulder frame 22 consists of two parts which are bolted together being split at the centerline of segment stem 16. The result being a sealed mechanism. This facilitates drum assembly and prevents dirt from getting into the mechanism.

Cam means 23 is comprised of cam rollers 24 and conical cam track 25. Each cam roller 24 is rotatably fastened at inward end portions of each segment stem 16. Each cam roller 24 is slidably mounted in cam track 25, which is, in turn, slidably mounted coaxially on hollow spindle 14.

Drive shafts 26 and 27 are axially positioned within hollow spindle 14 and are preferably provided with screw threads 28 and 29, respectively. Said screw threads 28 and 29 are of opposite pitch and are symmetrically disposed on either side of the radial centerline of drum 9. Drive shafts 26 and 27 are rigidly fastened together by coupling 30 positioned symmetrically of the radial centerline of drum 9 so that drive shafts 26 and 27 can be rotated in unison.

Each drive shaft 26 and 27 has threaded collar 31 rotatably mounted thereon. Each collar 31 is, in turn, connected to a cam track 25 by a plurality of pivot arms 32 rigidly fastened to cam track 25 and extending inwardly through slots 33 in spindle 14. Pivot arms 32 fasten to collar 31 by pivot pins 34. By this arrangement, power means 35 can move arcuate segments 15 and segment stems 16 radially by rotation of drive shafts 26 and 27 in unison and simultaneous axial movement of cam tracks 24 away from or toward the radial centerline of building drum 9. Power means 35 is a suitable hydraulic motor 36A housed in the tail stock mounting of the tire building machine adjacent inboard end portion 13. In addition, suitable means such as a spindle clutch-brake mechanism 36B is provided for rotation of spindle 14 and drive shafts 26 and 27 in unison, when the spindle clutch is engaged, and for rotation of drive shafts 26 and 27 independently of spindle 14 when the spindle clutch is disengaged and the spindle brake is engaged.

Additionally, a plurality of arcuate center segments 37 are preferably disposed cylindrically around drum 9 at center portion 38 of drum 9. Center segments 37 are composed of relatively rigid, preferably metal elements which are relatively narrow in width compared to length, and which cooperatively define a substantially cylindrical surface at center portion 38 about spindle shaft 14 of drum 9. Arcuate center segments 37 are overlaid and nest with the arcuate segments 15 at opposite end portions 12 and 13 by grooves 39. Center segments 37 are thus adapted to provide a bridge between arcuate segments 15 and slide over arcuate segments 15 at each end portion 12 and 13 as drum 9 is axially expanded and contracted. Split annular guide ring 40 is also provided integral with and inwardly extending from said center segments 37. Guide ring 40 slidably engages center support ring 41 which is, in turn, rigidly fastened to spindle 14 at the radial centerline of drum 9. The guide means 40 thus slidably guide the center bridge segments 37 radially on radial movement of arcuate segments 15 and keep center segments axially positioned.

Preferably drum 9 is supported by guide support members 42 at a preset radial position to form a rigid bridge structure of arcuate segments 15 at each end portion 12 and 13 when the drum is fully expanded. Each support member 42 includes guide support ring 43 positioned coaxially about spindle 14 and has a beveled surface 44 which engages and locks with beveled structure 45 at the inward end of each push rod 17. Guide ring 43 is, in turn, axially mounted on cam track 25 by pins 46 integral with cam track 25 and key 47. Guide ring 43 is slidably held in position by compression springs 48 which urge the guide support ring 43 against hold back ring 49. Hold back ring 49 is, in turn, positioned coaxially about spindle 14 on cap screws 49A which are also integral with end portions of cam track 25. By this arrangement, guide ring 43 can move axially against springs 48, while push rods 17 are moving radially, so that beveled surface 44 of ring 43 can mesh with beveled surfaces 45 of push rods 17 without binding.

As shown, this support feature comes into operation only during the last one-sixteenth inch of expansion of the building drum. However, it is apparent from the description that the support can be provided at any one or more preset positions during the expansion of the building drum. The advantage of the support member is that it provides a firm surface for stitching and, in turn, better quality tires. This feature also provides for more even spreading of the cords in the plies and more advantageous removal of the tires from building drum 9 after assembly because the diameter of the drum is more uniformly maintained along its axial length—the drum does not taper to a smaller diameter toward the radial centerline of the drum.

To provide for axial setting of the building drum for different size tires, each shoulder frame 22 is also slidably supported axially on spindle 14. Each frame 22 is held axially during tire building operations by tie rod assemblies 50 at each end portion 12 and 13, with each assembly including tie rods 51 about spindle 14 with threaded end portions 52. Tie rods 51 are rigidly fastened to spindle 14 outwardly of end portions 12 and 13 by mounting lugs 53 and cap screws 54 on the right side end and flange 58 and cap screws 62 on the left side. Tie rods 51 are, in turn, fastened to lugs 53 and flange 58 by lock nuts 55 and 63 respectively. Each assembly 50 also includes pivot ends 56 and pivot pins 57 and bifurcated flanges 57A integral with frame 22. Frame 22 is thus held axially rigid relative to spindle 14 during tire building. When an axial reset is desired, lock nuts 55 and 63 are threaded off end portions 52 over tie rods 51 and/or away from flange 58 and lug 53 so that rods 51 are free to slide axially through lugs 53 and flange 58.

As shown in FIGS. 6 and 7 tie rod assemblies 59A also are provided at each end portion of the building drum for axially moving shoulder frames 22 from set to set. Each assembly 59A includes tie rods 59 with bifurcated end portions 60. Tie rods 59 are permanently attached at the non-bifurcated end to cam means 23. Each tie rod end portion is rigidly fastenable to a corresponding flange 66 on shoulder frame 22 by the insertion of pins 65 through tie rod holes 61 and flange holes 64. Each shoulder frame flange 66 is positioned 90° from flanges 57A on the drum shoulder.

Rigid fasteneing of cam means 23 to shoulder frames 22 through tie rods 59, pins 65 and flanges 66 provides a means for effecting the change in the axial set of the drum. Axial set of the drum is accomplished during the rigid fastening of the cam means 23 to the shoulder frame 22 by movement of the cam means 23 by rotating the motor driven screw.

In operation, the lock nuts 55 of the right assembly 50 and lock nuts 63 of the left assembly 50 are loosened, cam tracks 25 are then moved toward shoulder frames 22 until the second set of tie rods 59 on both ends of the drum pass through openings 67 in shoulder frames 22. Pins 65 of assemblies 59A are inserted. By rotation of drive shafts 27 and 28, the entire assembly of the cam means 23, shoulder frame 22, and acruate segments 15 can be moved toward or away from the radial centerline of the building drum so that drum 9 can be axially set.

To hold the drum in fixed set for tire building, pins 65 are removed and lock nuts 55 and 63 are tightened to prevent axial movement of shoulder frames 22. An alternate method of axially setting the shoulder frames after freeing rods 51 is as follows: The shoulder frames are moved by driving cam means 23 to either limit of cam operation. After the limit of cam operation is reached, the shoulder frames 22 are moved by the movement of cam means 23 by rotation of drive shafts 27 and 28. To be more specific, lock nuts 55 and 63 of each assembly 50 are loosened. By rotation of drive shafts 27 and 28, the entire assembly of the cam means 23, shoulder frame 22 and arcuate segments 15 are moved toward or away from the radial centerline of the building drum so that drum 9 can be axially set.

The resulting building drum 9 is particularly suitable for building giant off-the-highway pneumatic tires where the axial setting of the building drum 9 is preferably alternative to the drum expansion. Tie rod assemblies 50 provide axial support for shoulder frames 22 to avoid high thrust and bending loads on spindle 14 during expansion of the building drum and, in turn, provide dimensional stability for the drum during tire building and increased life for the building drum. The drum can, in turn, be utilized as a forming drum as described and shown in above-cited U.S. Pat. No. 3,475,254.

Shoulder frames 22 are also preferably extended outwardly of end portions 12 and 13 of drum 9 into annular extensions 11 to support turn-up bladders 68 adjacent said end portions. Annular extensions 11 have outer cylindrical surfaces 69 consisting of turnover bladders 68, which in coaction with portions of the bead ring seating or carrier means (called "annular pushover rings") (not shown), provide turnover means to wrap edge portions of the rubberized fabric plies disposed on drum 9 about bead rings. Bladders 68 are inflated by air input to the bladders through conduits 70 and passageways 71 adjacent shoulder frames 22. The details of the construction and operation of the turnover bladders and the bead ring carriers are fully described in U.S. Pat. No. 3,171,769 and form a part of the present invention only in combination with other elements of the present invention as described herein.

By this arrangement, tie rod assemblies 50 provide axial support for turn-up bladders 68 during turn-up. Specifically, tie rods 51 take up the tension forces during drum expansion and turn-up. The drum set and turn-up can be thus increased in dimensional stability, which is particularly significant when considering the high forces involved in the drum set and turn-up of plies in the making of giant off-the-highway pneumatic tires. Further, high thrust and bending loads on spindle 14 are thereby avoided during turn-up of the tire beads as well as drum expansion.

Referring to FIGS. 3 and 4, building drum 9 preferably has alternate arcuate segments 15 covered with cover plates 72 which are fastened thereto by capscrews 73. Cover plates 72 overlap the opposite arcuate segments 15 around each end portion 12 and 13 to bridge gaps between segments 15 as the building drum expands. Alternatively or supplementary, the opposite alternate segments 15 may have short cover plate to fill and better smooth the surface between cover plates 72.

Referring particularly to FIG. 5, cylindrical surface 10 of drum 9 is also preferably covered with an elastomeric sleeve 74 disposed coaxially over said surface.

Sleeve 74 is fastened to end portions 12 and 13 of arcuate segments 15 by pins 75 slidably fastened into the segments. Openings 76 preferably with metal grommets to reinforce them are provided in sleeve 74 to engage pins 75 and fasten sleeve 74 to arcuate segments 15.

By this arrangement, more efficient use of drum expanding forces are made and larger expansions of drum 9 can be made than with previous building drums where the sleeve is fastened to a fixed member. This feature is particularly important in building drums for building giant off-the-highway pneumatic tires where the expansion of the drum diameter is of 7 to 10 inches (or about 20 to 25% of the collapsed diameter of the building drum); a sleeve fastened to a fixed member would make such large expansion inefficient and even impractical because of the large stretch which the sleeve must undergo. Moreover, significantly less relative movement results between the building drum on the one hand and the tire construction material on the other. Indeed, the radial stretch is virtually eliminated so that the quality of the pneumatic tire is significantly increased.

Still another advantage to this feature is more variance in axial set of the building drum. Sleeve 74 can be rapidly changed on the drum simply by dismounting the openings 76 from pins 75 and slipping the sleeve from the drum and thereafter pulling a second sleeve over the drum and attaching openings 76 of the second sleeve over pins 75. This feature also makes for rapid changing of the sleeve as well as more economical sleeve manufacture because no mold is required to form a bead around the outer circumference with which to "lock in the sleeve." This feature is particularly useful in building giant off-the-highway pneumatic tires because of the wide variance in bead diameters.

While presently preferred embodiments have been shown and described with particularity, it is distinctly understood that the invention may be otherwise variously embodied and performed within the scope of the following claims.

What is claimed is:

1. A tire building machine having:
   A. a building drum of substantially cylindrical shape and of uniform diameter during expansion and contraction having an infinite number of diameter and length settings adapted for building at least a portion of a pneumatic tire thereon;
   B. a hollow spindle for rotatably mounting the drum axially thereon;
   C. a plurality of arcuate segments positioned about the drum at opposite axial end portions of the drum to define at least a part of the cylindrical surface of the drum;
   D. a plurality of segment stems positioned in each said end portion of the drum with each segment stem adapted to radially support an arcuate segment;
   E. a plurality of stem support members positioned in each said end portion of the drum with each support member slidably supporting a segment stem;
   F. cam means slidably mounted coaxially on said hollow spindle at each said end portion of the drum adapted to move each of said segment stems and each of said arcuate segments an equal finite radial distance for any given axial movement of the cam means and to hold said arcuate segments in place at the termination of movement;
   G. at least one threaded drive shaft rotatably mounted within said hollow spindle adapted to move said cam means axially on rotation of said shaft to any position on a predetermined length of said shaft;
   H. power means mounted adjacent said drive shaft for rotationally driving said drive shaft any number of revolutions or portions thereof within a predetermined range;
   I. a clutch-brake mechanism attached to said power means for rotation of spindle and drive shaft in unison or for rotation of drive shaft independently of said spindle;
   J. a shoulder frame in each end portion of the building drum slidably fastened axially on said spindle to lengthen or shorten said building drum, said frame supporting said stem support members;
   K. turn-up bladders supported by said shoulder frame positioned adjacent said end portions outwardly of said building drum;
   L. tie rod means capable of rigidly fastening the shoulder frame relative to said spindle while leaving the cam means axially slidable on the spindle to provide for an infinite number of controlled drum diameter settings and while retaining a fixed drum length;
   M. means capable of fastening the cams means relative to said shoulder frame to provide for an infinite number of controlled drum lengths.

2. An expansible tire building machine as set forth in claim 1 comprising in addition:
   N. cover plates fastened to alternate arcuate segments around each end portion of the building drum overlapping the opposite alternate arcuate segments to bridge spaces between arcuate segments as the building drum expands.

3. An expansible tire building machine as set forth in claim 1 wherein:
   said tie rods axially support said shoulder frame at least during building of bead portions of a tire carcass thereon.

4. An expansible tire building drum comprising:
   A. a building drum of substantially cylindrical shape adapted for building at least a portion of a pneumatic tire thereon;
   B. a hollow spindle for rotatably mounting the drum axially thereon;
   C. a plurality of arcuate segments positioned about the drum at opposite axial end portions of the drum to define at least a part of the cylindrical surface of the drum;
   D. a plurality of segment stems positioned in each said end portion of the drum with each segment stem adapted to radially support an arcuate segment;
   E. a plurality of stem support members positioned in each said end portion of the drum with each support member slidably supporting a segment stem;
   F. cam means slidably mounted coaxially on said hollow spindle at each said end portion of the drum adapted to move each of said segment stems and each of said arcuate segments an equal finite radial distance for any given axial movement of the cam means and to hold said arcuate segments in place at the termination of movement;
   G. at least one drive shaft rotatably mounted within said hollow spindle adapted to move said cam means axially on rotation of said shaft to any position on a predetermined length of said shaft;

H. power means mounted adjacent said drive shaft for rotationally driving said drive shaft any number of revolutions or portions thereof within a predetermined range;

I. a clutch-brake mechanism attached to said power means for rotation of spindle and drive shaft in unison or for rotation of drive shaft independently of said spindle;

J. a shoulder frame in each end portion of the building drum slidably fastened axially on said spindle to lengthen or shorten said building drum, said frame supporting said stem support members;

K. tie rod means capable of rigidly fastening the shoulder frame relative to said spindle while leaving the cam means axially slidable on the spindle;

L. turn-up bladders supported by said shoulder frame, positioned adjacent said end portions outwardly of said building drum;

M. a plurality of push rods positioned centrally of said segment stems at each said end portion of the drum;

N. a plurality of rod support members positioned in each said end portion of the drum with each support member slidably supporting a push rod; and O. at least one guide support member mounted about said rotatable spindle at each said end portion of the drum and adapted to engage said push rods when the arcuate segments are extended to a preset radial position and radially support said arcuate segments substantially rigid.

5. An expansible tire building drum as set forth in claim 1 wherein:

two said drive shafts are mounted in said hollow spindle with threads of opposite pitch, one adjacent each end portion of the drum; and said power means is adapted to rotate said drive shafts in unison to radially move said segment stems and said arcuate segments at both end portions of the drum simultaneously.

6. An expansible tire building drum as set forth in claim 4 comprising in addition:

R. cover plates fastened to alternate arcuate segments around each end portion of the building drum overlaying the opposite alternate arcuate segments to bridge spaces between arcuate segments as the building drum expands.

* * * * *